US007954315B2

(12) United States Patent
Yamashita

(10) Patent No.: US 7,954,315 B2
(45) Date of Patent: Jun. 7, 2011

(54) HYDRAULIC CIRCUIT STRUCTURE OF WORK VEHICLE

(75) Inventor: Masaaki Yamashita, Chikugo (JP)

(73) Assignee: Yanmar Co., Ltd., Osaka (JP)

( * ) Notice: Subject to any disclaimer, the term of this patent is extended or adjusted under 35 U.S.C. 154(b) by 769 days.

(21) Appl. No.: 11/908,588

(22) PCT Filed: Jan. 23, 2006

(86) PCT No.: PCT/JP2006/300951
§ 371 (c)(1),
(2), (4) Date: Nov. 2, 2007

(87) PCT Pub. No.: WO2006/098085
PCT Pub. Date: Sep. 21, 2006

(65) Prior Publication Data

US 2009/0077958 A1 Mar. 26, 2009

(30) Foreign Application Priority Data

Mar. 14, 2005 (JP) ................................ 2005-071903

(51) Int. Cl.
*F16D 31/02* (2006.01)

(52) U.S. Cl. ........................................................ 60/421

(58) Field of Classification Search .................... 60/421, 60/422
See application file for complete search history.

(56) References Cited

U.S. PATENT DOCUMENTS 3,922,866 A 12/1975 Benning
5,848,531 A * 12/1998 Nakamura et al. .............. 60/426
5,950,426 A 9/1999 Morita et al.
5,996,341 A 12/1999 Tohji
6,148,548 A 11/2000 Tohji
7,047,735 B2 * 5/2006 Sprinkle et al. ................. 60/422
2002/0014074 A1 2/2002 Ehara et al.

FOREIGN PATENT DOCUMENTS

EP 1 146 175 A 10/2001
JP 55 108538 A 8/1980
JP 57-51758 3/1982
JP 04 118428 A 4/1992
JP 2000-154775 6/2000
JP 2001-049687 2/2001

* cited by examiner

*Primary Examiner* — F. Daniel Lopez
(74) *Attorney, Agent, or Firm* — Sterne, Kessler, Goldstein & Fox P.L.L.C.

(57) ABSTRACT

A hydraulic circuit structure of a work vehicle capable of solving a problem in a conventional structure wherein, in a machine attitude control in back hoe operation, pressure oil is preferentially fed to light-loaded machines and some work machines are slowly moved or stopped and, accordingly, the attitudes of the machines cannot be rapidly controlled and work performance is affected. To solve this problem, the hydraulic circuit of the work vehicle comprises two valve groups for a loader and a back hoe having circuits to supply the pressure oil from one hydraulic pump to a valve group for back hoe control through a valve group for loader control and the pressure oil from the other hydraulic pump directly to the valve group for back hoe control. The pressure oil is independently supplied from the hydraulic pumps to valve sections for controlling right and left stabilizer cylinders installed in the valve group for back hoe control.

12 Claims, 10 Drawing Sheets

HYDRAULIC CIRCUIT STRUCTURE OF WORK VEHICLE

BACKGROUND OF THE INVENTION

1. Technical Field

The present invention relates to a hydraulic circuit structure of a work vehicle and more specifically to a hydraulic circuit structure for efficient driving of hydraulic work machines attached to a work vehicle.

2. Background Art

Conventionally, a work vehicle such as a back hoe loader is equipped with a plurality of hydraulic systems and hydraulic oil is supplied by one hydraulic pump. Work machines and the hydraulic pump are connected in parallel (e.g., refer to Patent Document 1).

[Patent Document 1] Japanese Patent Application Laid-Open No. 2001-49687

DISCLOSURE OF THE INVENTION

Problem to Be Solved

However, in a machine attitude control in a back hoe operation, pressure oil is preferentially fed to light-loaded machines and some work machines are slowly moved or stopped and, accordingly, the attitudes of the machines cannot be rapidly controlled and work performance is affected.

Solution

To solve the above problem, the present invention takes the following approach.

According to the first aspect of the invention, in a hydraulic circuit structure of a work vehicle, the circuit comprising two valve groups for a loader and a back hoe having circuits to supply pressure oil from a first hydraulic pump to the valve group for back hoe control through the valve group for loader control and pressure oil from a second hydraulic pump directly to the valve group for back hoe control, the valve group for back hoe control includes a first stabilizer control selector valve for controlling one of left and right stabilizer cylinders, a second stabilizer control selector valve for controlling the other of the left and right stabilizer cylinders, a swing control selector valve, an arm control selector valve, a boom control selector valve, and a bucket control selector valve, the first hydraulic pump supplies the pressure oil to the first stabilizer control selector valve, the swing control selector valve, and the arm control selector valve, the second hydraulic pump supplies the pressure oil to the boom control selector valve, the bucket control selector valve, and the second stabilizer control selector valve, the swing control selector valve on an upstream side and the arm control selector valve on a downstream side are tandem-connected to a discharge oil path of the first hydraulic pump, a discharge oil path of the second hydraulic pump is connected to the boom control selector valve and the bucket control selector valve and then connected to the discharge oil path of the first hydraulic pump between the swing control selector valve and the arm control selector valve via a check valve, and a selector valve for selecting connection to or disconnection from a tank is provided upstream of the check valve.

According to a second aspect of the invention, in the first aspect, a bleed throttle is provided to an oil path connecting a P port and a T port of the swing control selector valve.

According to a third aspect of the invention, in the first aspect, an operation interlock for actuating the selector valve for selection and the swing control selector valve in synchronization by one operating lever is provided.

According to a fourth aspect of the invention, in the third aspect, spool returning spring forces of the selector valve for selection and the swing control selector valve are set smaller than returning spring forces of other control selector valves of the valve group for back hoe control or the valve group for loader control so that a resultant force of spool operating forces of the selector valve for selection and the swing control selector valve becomes substantially equal to spool operating forces of other control selector valves.

According to a fifth aspect of the invention, in the first aspect, the two hydraulic pumps are variable displacement piston pumps, respectively.

According to a sixth aspect of the invention, in the fifth aspect, the two hydraulic pumps are variable displacement piston pumps integrated with each other.

According to a seventh aspect of the invention, in the sixth aspect, a fixed gear pump for supplying the pressure oil to a steering cylinder for controlling steered wheels and a charge circuit of a hydrostatic transmission is integrally provided to the two hydraulic pumps.

According to an eighth aspect of the invention, in the first aspect, first break point pressure is set to be one pump relief pressure or higher in a P-Q characteristic of the variable displacement piston pump.

According to a ninth aspect of the invention, in the first aspect, a fixed gear pump for supplying the pressure oil to a steering cylinder for controlling steered wheels and a charge circuit of a hydrostatic transmission and two variable displacement hydraulic pumps are integrated with each other and share a hydraulic oil introduction port.

According to a tenth aspect of the invention, in a hydraulic circuit structure of a work vehicle, the circuit including first and second two valve groups for operation and respectively formed of a plurality of selector valves for respectively controlling directions and flow rates of the pressure oil supplied to a plurality of actuators and having circuits to supply pressure oil from a first hydraulic pump to the second valve group through the first valve group and pressure oil from a second hydraulic pump directly to the second valve group, an operation mode selecting selector valve for selectively switching between connection and disconnection of the pressure oil from both the first and second hydraulic pumps to or from a tank is integrally built in the first valve group located upstream in a discharge oil path of the first hydraulic pump.

According to an eleventh aspect of the invention, in the tenth aspect, a fixed gear pump for supplying pressure oil to a steering cylinder for controlling steered wheels and a charge circuit of a hydrostatic transmission and two variable displacement hydraulic pumps are integrated with each other and share a hydraulic oil introduction port.

According to a twelfth aspect of the invention, in the tenth aspect, the operation mode selecting selector valve is built in a most downstream position in the first valve group.

According to a thirteenth aspect of the invention, in the tenth aspect, a selector valve for switching between connection and disconnection of the pressure oil from both the pumps to and from the tank is provided with a detent or is of a solenoid valve type so that a switched state can be maintained.

According to a fourteenth aspect of the invention, in the twelfth aspect, one relief valve is provided in the first valve group for each of the first and second hydraulic pumps, the relief valves respectively determining maximum operating pressures of the plurality of actuators driven by the pressure oil from the two hydraulic pumps.

According to a fifteenth aspect of the invention, in the fourteenth aspect, one of the two relief valves for determining maximum operating pressures of the plurality of actuators driven by the pressure oil from the two hydraulic pumps is disposed in an inlet section and the other is disposed in a port relief valve built-in position in the most downstream section in the first valve group.

Effects of the Invention

With the hydraulic circuit structure of the work vehicle according to the first aspect of the invention, it is possible to actuate the respective stabilizer cylinders irrespective of the load and speedy attitude control of the machine becomes possible.

Moreover, the pressure oil of the pump connected to the boom and the bucket is supplied to the arm control valve section by switching the selector valve in the position on the upstream side of the check valve and for selecting connection to or disconnection from the tank. Therefore, it is possible to actuate the arm when it is operated simultaneously with the swing.

With the hydraulic circuit structure of the work vehicle according to the second aspect of the invention, by allowing a surplus flow rate of the pressure oil supplied to the swing which requires a relatively small flow rate to flow into the arm, the arm can be actuated in operation in combination with the swing and the boom.

With the hydraulic circuit structure of the work vehicle according to the third aspect of the invention, it is possible to simultaneously control the swing section and the selector valve with only one lever action.

With the hydraulic circuit structure of the work vehicle according to the fourth aspect of the invention, a feeling of the lever operation is improved.

With the hydraulic circuit structure of the work vehicle according to the fifth aspect of the invention, it is possible to obtain high work performance with small engine horsepower.

With the hydraulic circuit structure of the work vehicle according to the sixth aspect of the invention, it is possible to make the installation space of the pump compact to reduce the cost.

With the hydraulic circuit structure of the work vehicle according to the seventh aspect of the invention, it is possible to make the installation space of the pump compact.

With the hydraulic circuit structure of the work vehicle according to the eighth aspect of the invention, it is possible to efficiently use pressure and flow rate by taking advantage of the variable displacement pumps when the two pumps are used. When one pump is used, the pump can be used in a range without a change in the flow rate due to the pressure to thereby enhance the work performance.

With the hydraulic circuit structure of the work vehicle according to the tenth aspect of the invention, the valve installation space becomes compact. As a result, the number of kinds of the valve groups does not increase and therefore the circuit can be structured at low cost. In the operation that requires only one pump (loader operation), the oil from the other pump is unloaded into the tank by a short route and therefore becomes less susceptible to pressure loss of the piping and engine horsepower can be used effectively.

With the hydraulic circuit structure of the work vehicle according to the ninth aspect and the eleventh aspect of the invention, the valve installation space becomes compact. As a result, the number of kinds of the valve groups does not increase and therefore the circuit can be structured at low cost. In the operation that requires only one pump (loader operation), the oil from the other pump is unloaded into the tank by a short route and therefore becomes less susceptible to pressure loss of the piping and engine horsepower can be used effectively. The suction resistance of the hydraulic oil can be reduced.

With the hydraulic circuit structure of the work vehicle according to the twelfth aspect of the invention, it is possible to supply the pressure oil to the upstream valve section irrespective of the switched state of the selector valve. For example, in the embodiment, it is possible to actuate the loader work machine even after switching to the back hoe operation state. The loader bucket can be brought in contact with the ground to secure stability in the operation or the bucket can be lifted to facilitate movement of the machine.

With the hydraulic circuit structure of the work vehicle according to the thirteenth aspect of the invention, it is possible to supply the pressure oil to the upstream valve section irrespective of the switched state of the selector valve.

With the hydraulic circuit structure of the work vehicle according to the fourteenth aspect of the invention, it is possible to supply the pressure oil to the upstream valve section irrespective of the switched state of the selector valve.

With the hydraulic circuit structure of the work vehicle according to the fifteenth aspect of the invention, it is possible to supply the pressure oil to the upstream valve section irrespective of the switched state of the selector valve.

BEST MODE FOR CARRYING OUT THE INVENTION

The present invention employs an open center method in a hydraulic circuit to thereby effectively utilize a hydraulic pump flow rate and circuit pressure in a work vehicle having an engine of a small output.

Embodiment 1

Overall Structure

A work vehicle according to an embodiment of the present invention will be described.

Figure 1:
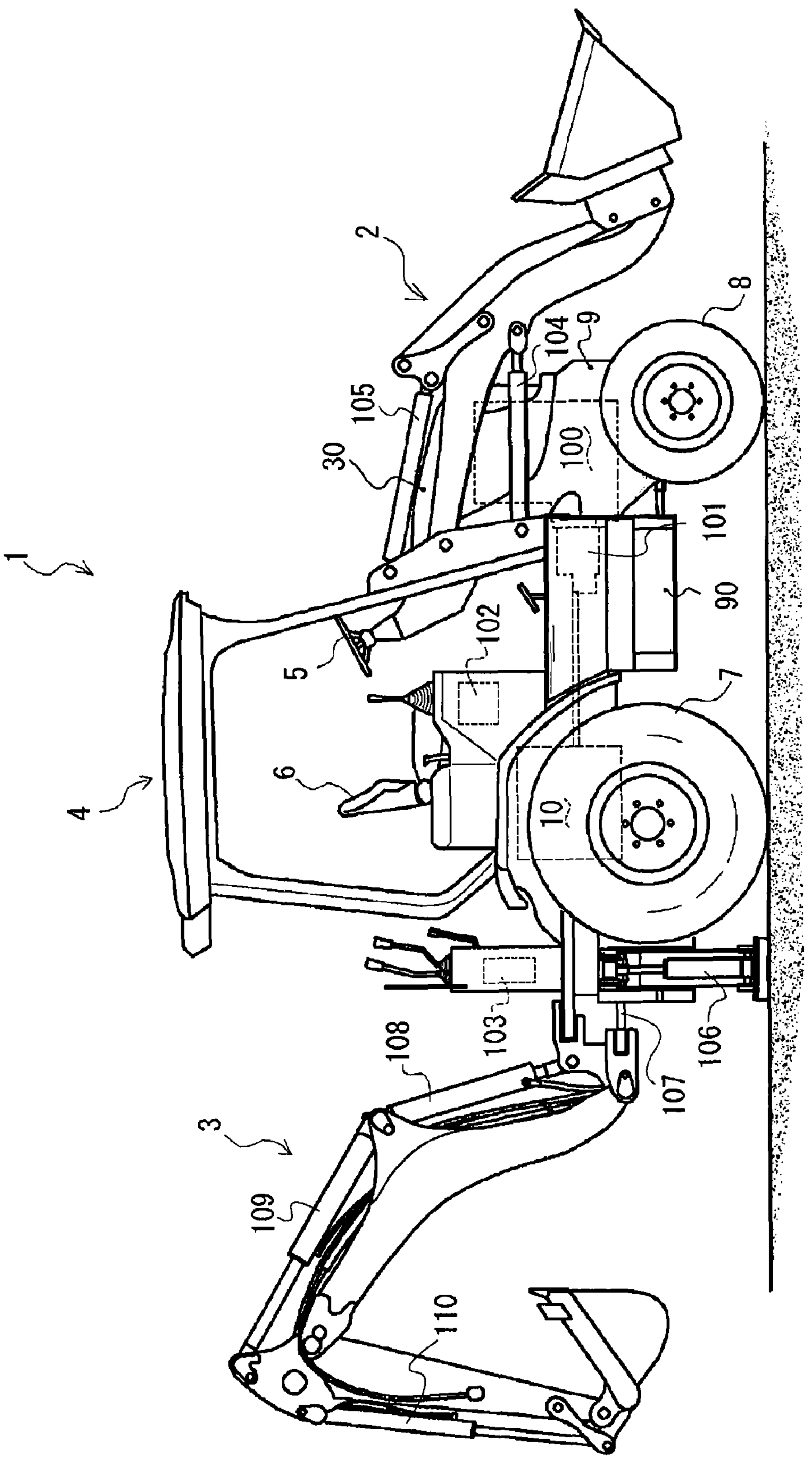
FIG. 1 is a general side view of a work vehicle.

FIG. 1 is a general side view of the work vehicle.

The work vehicle 1 shown in FIG. 1 is a tractor loader back hoe and is mounted with a loader 2 and a drilling device 3. A control section 4 is provided at a center, the loader 2 is disposed at the front, and the drilling device 3 is disposed at the rear of the work vehicle 1. The work vehicle 1 is mounted with front wheels 8 and rear wheels 7 and can travel while mounted with the loader 2 and the drilling device 3.

In the control section 4, a steering wheel 5 and an operator's seat 6 are disposed. Travel operation devices and operation devices for the loader 2 are disposed on a side of the seat 6. Therefore, steering operation of the work vehicle 1 and operation of the loader 2 can be carried out in the control section 4.

The loader 2 as a loading device is connected to side portions of the work vehicle 1 to extend forward and is mounted at its tip end with a bucket. An engine is disposed at a front portion of a frame 9 that is a chassis of the work vehicle 1 and a bonnet 30 disposed on the frame 9 covers the engine. The loader 2 is disposed outside the bonnet 30.

The drilling device 3 is detachably attached to a rear portion of the work vehicle 1 and is operated with operating devices disposed behind the operator's seat 6.

A hydraulic oil tank 90 is disposed on a side of the control section 4 and also functions as a step used for getting into and out of the control section 4. On an opposite side of the control section 4, a step formed of a fuel tank is provided. The hydraulic oil tank 90 is a reservoir tank for hydraulic oil.

The engine 100 is disposed in the bonnet 30 and a hydraulic pump 101 for supplying hydraulic oil to work machines attached to the work vehicle 1 is disposed behind the engine 100. The driving force of the engine 100 is input to the hydraulic pump 101 and the hydraulic pump 101 supplies the hydraulic oil to the work machines. The driving force of the engine 100 is transmitted to a transmission 10 via the hydraulic pump 101 and the driving force drives the rear wheels 7 via the transmission 10.

The hydraulic pump 101 supplies hydraulic oil to lift cylinders 104 and dump cylinders 105 for the loader 2 and supplies hydraulic oil to a boom cylinder 108, an arm cylinder 109, a bucket cylinder 110, and swing cylinders for sliding rods 107 for the back hoe that is the drilling device 3 and to stabilizer cylinders 106. Furthermore, the hydraulic pump 101 also supplies hydraulic oil to a power steering cylinder for steering the front wheels 8.

An operating portion for the loader 2 is disposed on a side of the operator's seat 6 and a control valve unit 102 for the loader 2 is disposed in the operating portion.

For the drilling device 3, an operating portion for the drilling device 3 is connected to a rear portion of the work vehicle 1 and a control valve unit 103 for the drilling device 3 that is the back hoe is disposed in the operating portion.

[Hydraulic Circuit]

Next, the hydraulic circuit of the work machines will be described.

Figure 2:
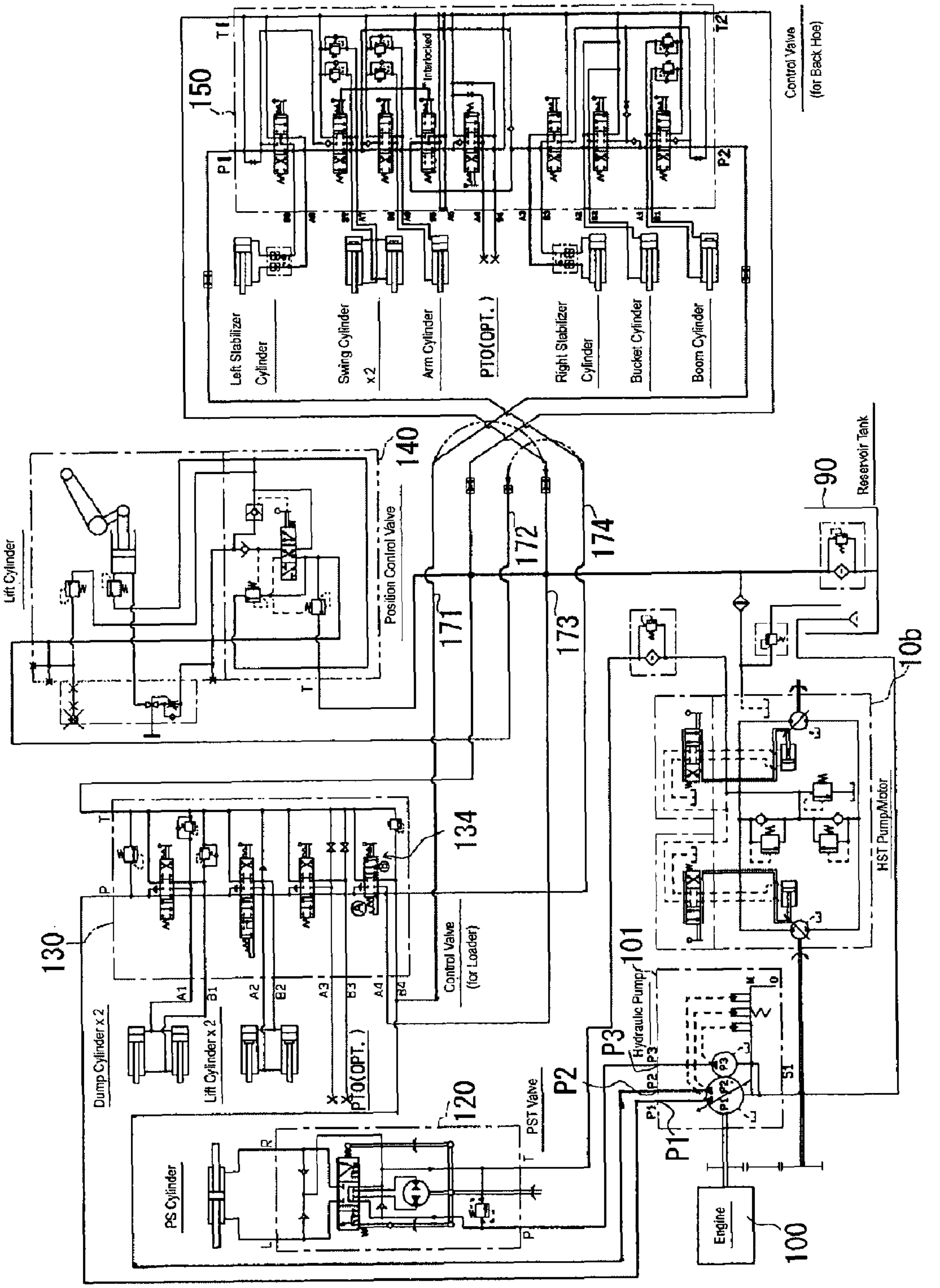
FIG. 2 is a diagram showing a hydraulic circuit of work machines.

FIG. 2 is a drawing showing the hydraulic circuit of the work machines.

The hydraulic circuit is formed of the hydraulic pump 101, a power steering valve section 120, a control valve section 130 for the loader, a position control valve section 140 for the lift cylinder, a control valve section 150 for the back hoe, an HST section 10*b*, and the like.

Hydraulic oil is supplied to the hydraulic circuit by the hydraulic pump 101 driven by the engine 100.

The power steering valve section 120 carries out control of the steering cylinder and controls sliding of the steering cylinder with a control valve of the power steering valve section 120 according to operation of the steering wheel 5.

The control valve section 130 for the loader controls supply of hydraulic oil to the lift cylinders 104 and the dump cylinders 105 of the loader 2 and includes a selector valve 134 for selecting an operation mode. With this selector valve 134, it is possible to switch between a back hoe position for back hoe operation or use of a hydraulic lift and a loader position for traveling of the work vehicle or loader operation.

The position control valve section 140 for the lift cylinder carries out control of the lift cylinder of a lift mechanism provided at the rear portion of the work vehicle 1.

The control valve section 150 for the back hoe carries out control of sliding of the boom cylinder 108, the arm cylinder 109, the bucket cylinder 110, and the swing cylinder of the back hoe and the stabilizer cylinders 106.

The HST section 10*b* carries out gear shifting of the work vehicle with the driving force of the engine 100.

The hydraulic circuit shown in FIG. 2 is at the time when the back hoe is attached.

When the hydraulic lift is attached, an oil path 171 and an oil path 173 are connected and an oil path 172 and an oil path 174 are connected.

The hydraulic oil is recovered by the hydraulic oil tank 90 and the recovered hydraulic oil is fed to the hydraulic pump 101 and the HST section 10*b*.

Discharge ports P1, P2, and P3 from which the hydraulic oil is discharged by independent pumps, respectively, are connected to the hydraulic circuit shown in FIG. 2. The hydraulic oil from the discharge port P1 passes through the control valve section 130 that is a valve group for loader control and is supplied to the control valve section 150 that is a valve group for back hoe control.

Then, in the control valve section 150, the hydraulic oil can be independently supplied to each of the valves for controlling the left and right stabilizer cylinders 106. As a result, it is possible to actuate the respective stabilizer cylinders 106 to rapidly control an attitude of the work machine irrespective of a load on the machine.

In the control valve section 150 that is the valve group for the back hoe control, one of two hydraulic pumps supplies pressure oil to the stabilizer cylinder 106, the swing cylinder, and the arm cylinder 109 and the other hydraulic pump supplies pressure oil to the boom cylinder 108, the bucket cylinder 110, and the stabilizer cylinder.

[Hydraulic Pump]

Next, a structure of the hydraulic pump 101 for supplying pressure oil to the work machines will be described.

Figure 3:
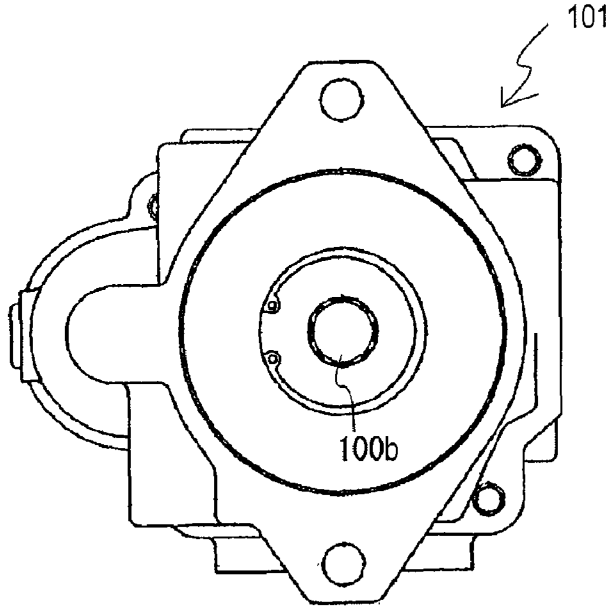
FIG. 3 is a front view of a hydraulic pump.

FIG. 3 is a front view of the hydraulic pump.

Figure 4:
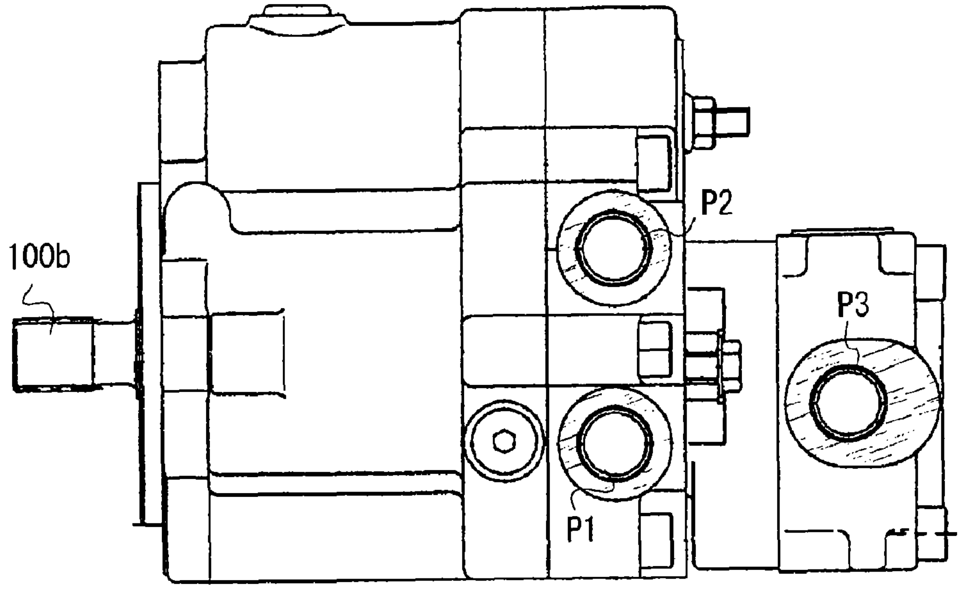
FIG. 4 is a right side view of the hydraulic pump.

FIG. 4 is a right side view of the hydraulic pump.

Figure 5:
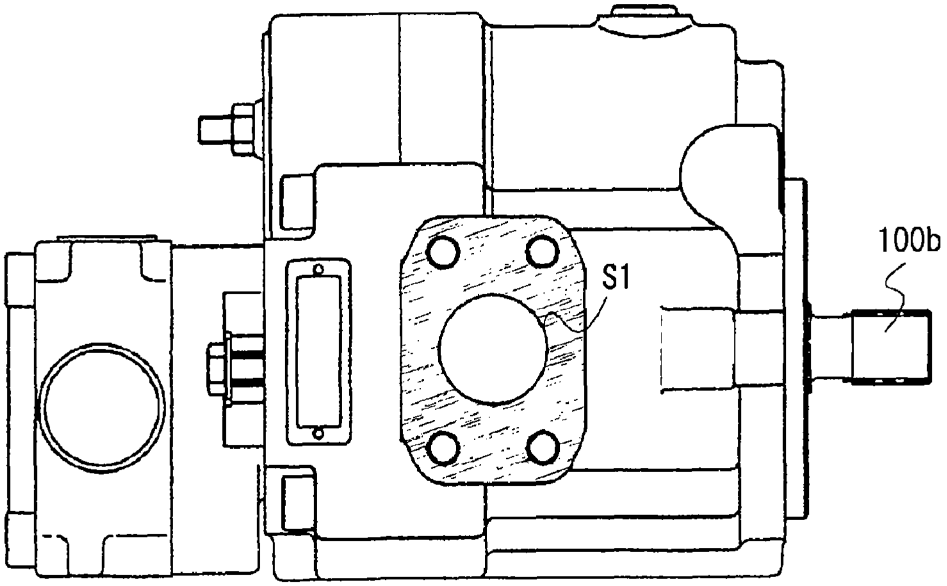
FIG. 5 is a left side view of the hydraulic pump.

FIG. 5 is a left side view of the hydraulic pump.

Figure 6:
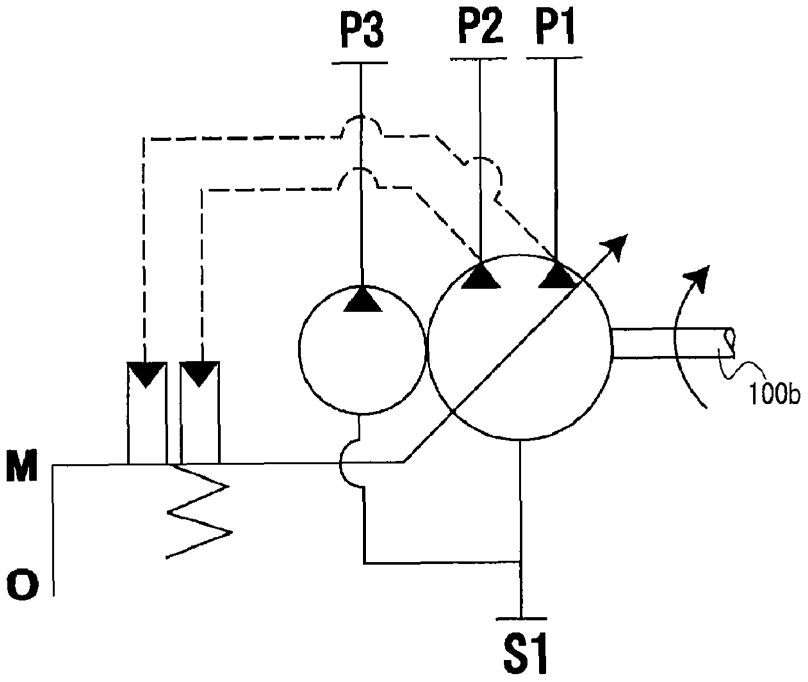
FIG. 6 is a hydraulic circuit diagram of the hydraulic pumps.

FIG. 6 is a hydraulic circuit diagram of the hydraulic pump.

Figure 7:
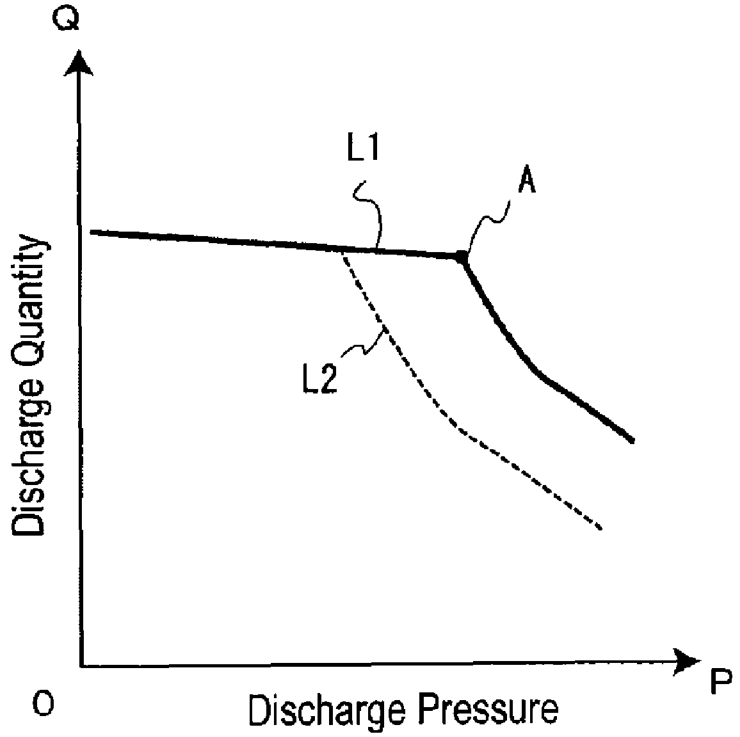
FIG. 7 is a diagram showing a P-Q characteristic of the hydraulic pump.

FIG. 7 is a diagram showing a P-Q characteristic of the hydraulic pump.

The driving force is input to the hydraulic pump 101 from an input shaft 100*b*. The hydraulic pump draws in the hydraulic oil from a suction port Si and discharges the hydraulic oil from the discharge ports P1, P2, P3 with this driving force. The discharge ports P1, P2, P3 respectively discharge the hydraulic oil with independent pumps and the discharge ports P1, P2 are respectively connected to variable displacement hydraulic pumps. The variable displacement hydraulic pumps connected to the discharge ports P1, P2 adjust discharge quantities of the hydraulic oil according to discharge pressures. The discharge port P3 is connected to a fixed gear pump.

By respectively forming the two pumps in the hydraulic pump 101 as variable displacement piston pumps, it is possible to obtain improved workability by using the work machines even with the engine of small output. Moreover, because the two pumps are integrated with each other, it is possible to make an installation space of the hydraulic pump 101 compact and to reduce cost of manufacturing as compared with that in a case where separate two pumps are used.

Furthermore, by integrally providing the fixed gear pump for supplying pressure oil to the power steering valve section 120 and a charge circuit of the HST section 10*b* with the hydraulic pumps connected to the discharge ports P1, P2, it is possible to make an installation space of the pump for hydraulic oil compact.

In other words, by forming three independent hydraulic pumps in the hydraulic pump 101, it is possible to form the compact hydraulic pump 101 at low cost.

Moreover, by sharing the suction port Si among the three pumps, it is possible to simplify an introduction route of the hydraulic oil to reduce suction resistance in introduction of the hydraulic oil.

In FIG. 7, graphs L1, L2 show a relationship between the pressure and the discharge quantity of the hydraulic oil of the hydraulic pump. The graph L1 shows a case where the pressure of oil discharged from the P3 is lower than in a case of the graph L2. The graph L1 shows that the discharge quantity Q is substantially constant at first while the discharge pressure P rises. Then, when the discharge pressure further rises, the discharge quantity Q starts to reduce greatly. The point where the discharge quantity starts to reduce is a point A and the point A is a first break point. This results from actuation of a discharge quantity control mechanism of the variable displacement pump so as to reduce the load due to the rise in the discharge pressure.

First beak point pressure (swash plate tilting start pressure) that is the pressure at the point A is set to be equal to or higher than relief pressure of one pump. As a result, it is possible to efficiently utilize pressure and flow rate by taking advantage of the variable displacement pumps when the two pumps are used. When one pump is used, the pump can be used in a range without a change in the flow rate due to the pressure to thereby enhance the work performance.

[Control Valve Section for Loader]

Next, a structure of the control valve section 130 for the loader will be described.

Figure 8:
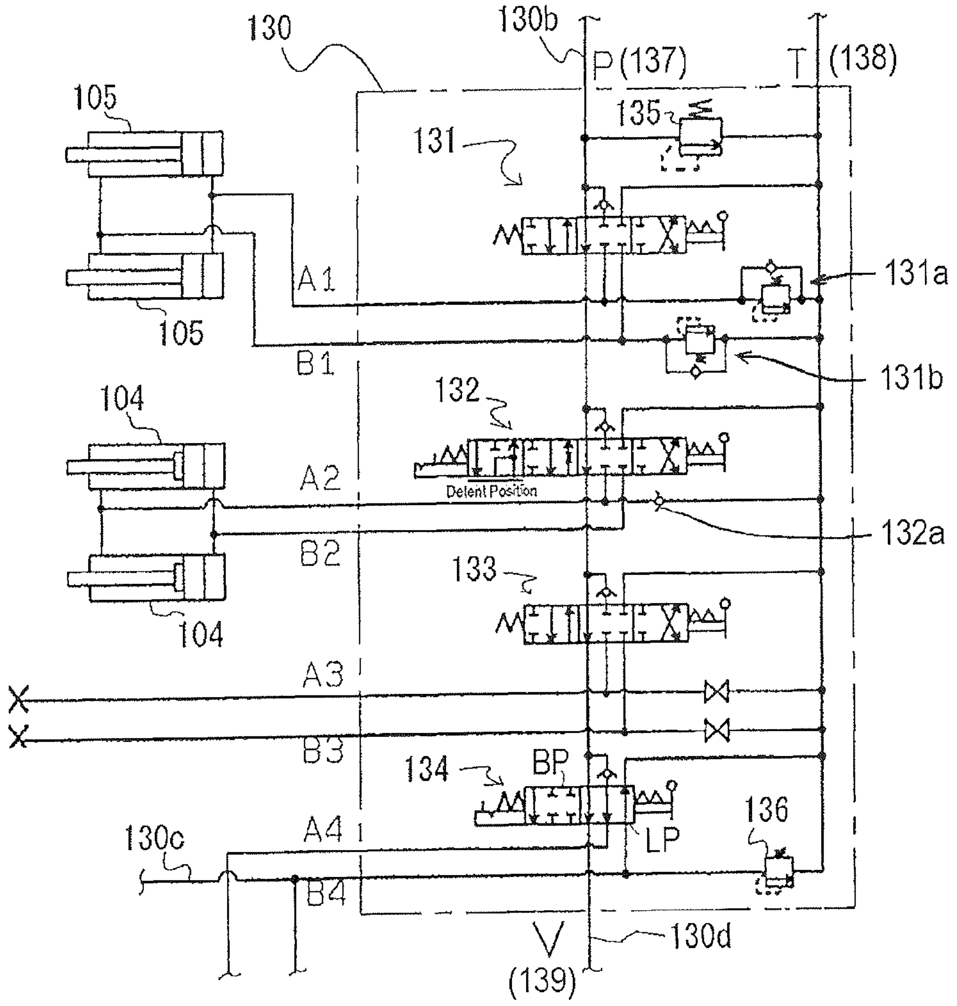
FIG. 8 is a hydraulic circuit diagram showing a structure of a control valve section for a loader.

FIG. 8 is a hydraulic circuit diagram showing the structure of the control valve section for the loader.

Figure 9:
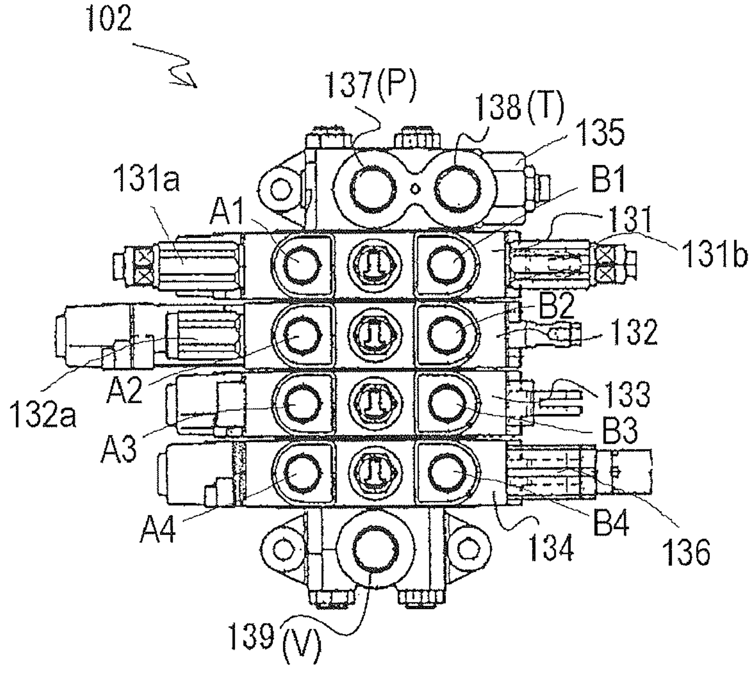
FIG. 9 is a drawing showing a structure of a unit forming the control valve section.

FIG. 9 is a drawing showing a structure of a unit forming the control valve section.

The control valve section 130 carries out control of the hydraulic cylinders for the loader and is formed of selector valves 131, 132, 133, 134 and relief valves 135, 136. By providing one relief valve 135 and one relief valve 136 (two in total) for determining maximum operating pressure of a plurality of actuators driven by the pressure oil from the two hydraulic pumps in the upstream selector valve group control valve section 130, it is possible to supply the pressure oil to the upstream valve section. Moreover, by disposing one of the two relief valves in an inlet section and the other in a port relief valve built-in position, it is possible to supply the pressure oil to the upstream valve section.

The selector valve 131 carries out control of the dump cylinders 105 and the selector valve 132 carries out control of the lift cylinders 104. The selector valve 133 carries out control of a PTO attached to a front loader 92.

The operation mode selecting selector valve 134 can be switched between a back hoe position BP for operating the back hoe or the hydraulic lift and a loader position LP for traveling of the work vehicle or operating the loader.

The relief valve 135 is a relief valve for the hydraulic oil supplied from the discharge port P1 and the relief valve 136 is a relief valve for the hydraulic oil supplied from the discharge port P2.

An oil path connected to the selector valves 131, 132, 133 and 134 is extended outward from the control valve section 130 through a pump port P (137) of the control valve section 130 so as to serve as an oil path 130*b* connected to the discharge port P1, and the relief valve 135 is provided between the pump port P and a tank port T (138) of the loader control valve section 130. An oil path 130*c* extended from the discharge port P2 to the control valve section 150 is branched out to extend into the control valve section 130 through a port B4 so as to be connected to the tank port T (138) through the operation mode selecting selector valve 134 and the relief valve 136.

The oil path for supplying pressure oil from the discharge port P1, serving as the oil path 130*c*, is also extended outward from the control valve section 130 through a carryover port V (139) so as to serve as an oil path 130*d* for supplying the pressure oil from the discharge port P1 to the control valve section 150.

As shown in FIG. 9, a unit 102 forming the control valve section 130 is formed with a pump port 137, serving as the pump port P, and a tank port 138, serving as the tank port T. In the unit 102, the selector valves 131, 132, 134, 133 are connected in order and a carryover port 139 (the carryover port V) is formed at a lower portion of the unit 102. In the unit 102, A ports, i.e., A1, A2, A3 and A4 ports connected to the respective selector valves 131, 132, 133 and 134, are formed on left side portions of the respective selector valves 131, 132, 133 and 134, and B ports, i.e., B1, B2, B3 and B4 ports connected to the respective selector valves 131, 132, 133 and 134, are formed on right side portions of the respective selector valves 131, 132, 133 and 134.

Relief valve plugs, serving as relief valves 131*a* and 131*b* as shown in FIG. 8, are attached to the selector valve 131. A selector valve 132 is provided with a detent mechanism for holding a state to which the selector valve 132 is switched, and is provided with a valve plug serving as an anti-cavitation check valve 132*a* as shown in FIG. 8. A relief valve plug serving as the relief valve 136 is also attached to the selector valve 134.

By integrally providing the selector valve 134 for selecting the work mode in the unit 102, it is possible to make the selector valve group compact. The selector valve 134 may be provided with a detent or may be of a solenoid valve type so that the switched state can be maintained. In this way, it is possible to supply the pressure oil to the upstream valve section irrespective of the state of the selector valve.

[Control Valve Section for Back Hoe]

Next, the control valve section for the back hoe will be described.

Figure 10:
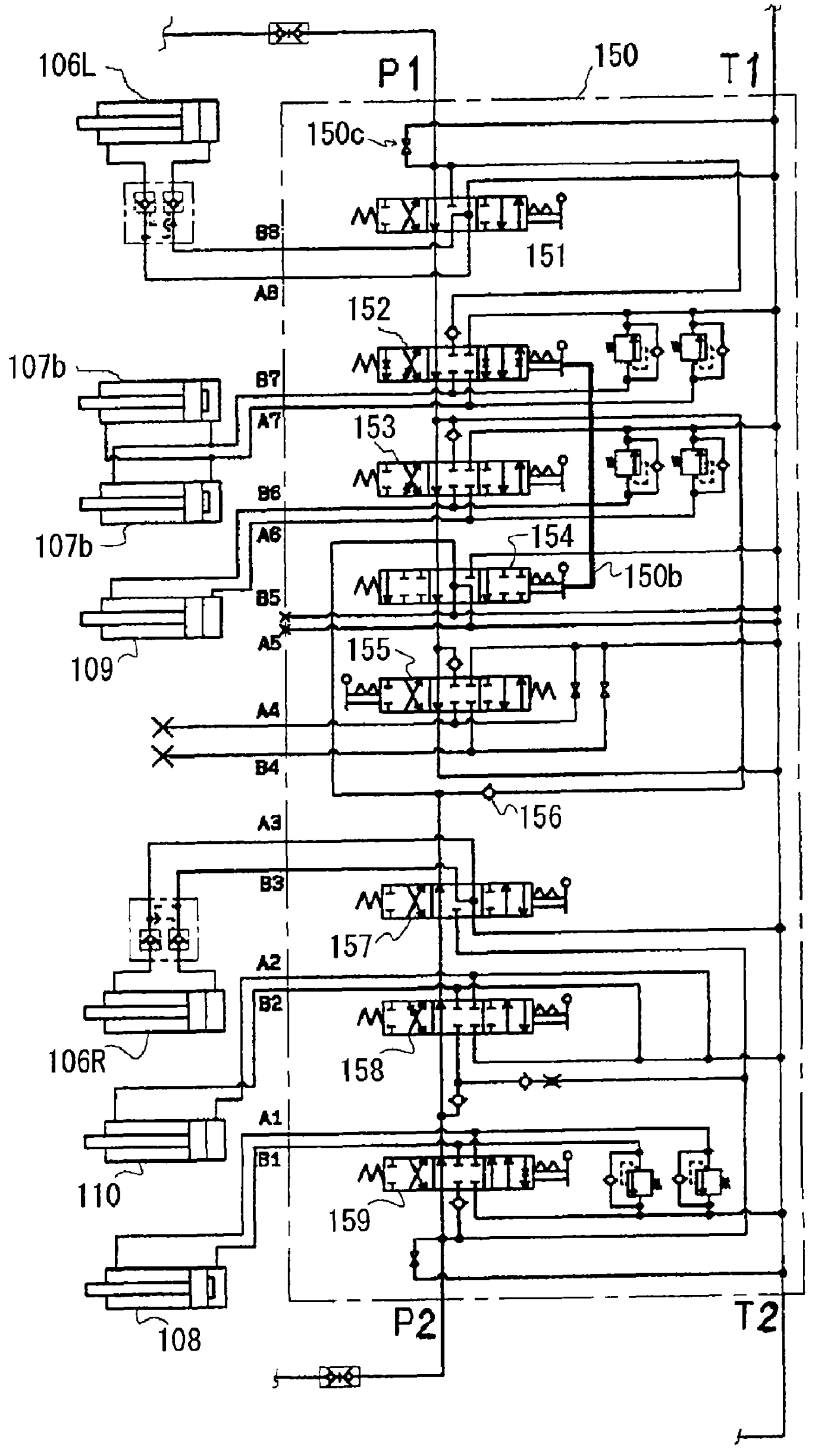
FIG. 10 is a hydraulic circuit diagram showing a structure of a control valve section for a back hoe.

FIG. 10 is a hydraulic circuit diagram showing a structure of the control valve section for the back hoe.

Figure 11:
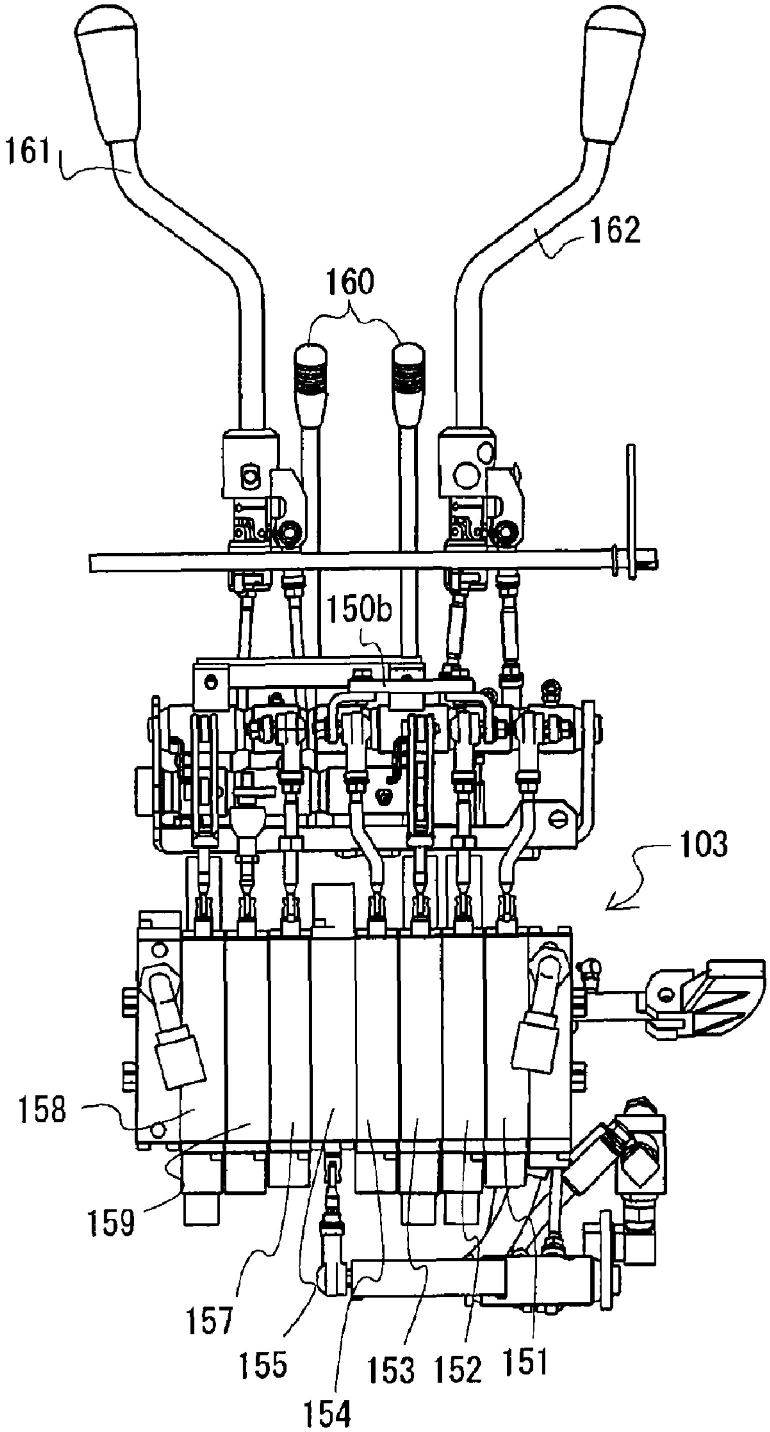
FIG. 11 is a front view of a unit forming the control valve section for the back hoe.

FIG. 11 is a front view of a unit forming the control valve section for the back hoe.

Figure 12:
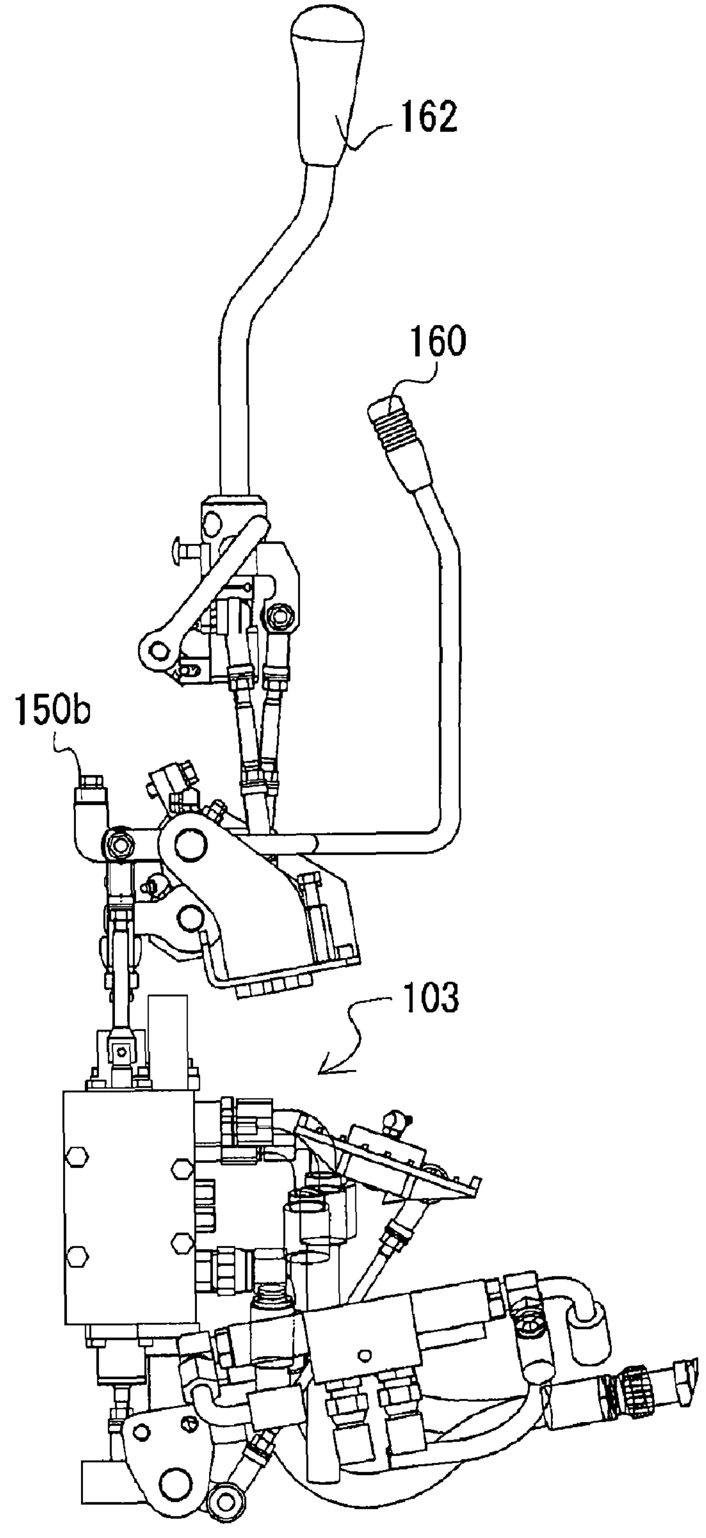
FIG. 12 is a side view of the same.

FIG. 12 is a side view of the same.

The control valve section 150 that is a valve group for back hoe control includes selector valves 151, 152, 153, 154, 155, 157, 158, 159 and includes a check valve 156 for connecting the discharge port P2 side and the discharge port P1 side.

The selector valve 151 carries out control of the left stabilizer cylinder 106L and the selector valve 157 carries out control of the right stabilizer cylinder 106R. The selector valve 152 carries out control of the swing cylinders 107*b*, 107*b*. The selector valve 153 carries out control of the arm cylinder 109 and the selector valve 154 is caused to operate in synchronization with the selector valve 152 by a coupling member 150*b*. The selector valve 155 is a hydraulic control valve for the PTO, the selector valve 158 carries out control of the bucket cylinder 110, and the selector valve 159 carries out control of the boom cylinder 108.

The control valve section 150 is formed of the control valve unit 103 shown in FIG. 11 and the control valve unit 103 is connected to levers 160, 161, 162 disposed in the operating portion of the drilling device 3. The lever 160 is a lever for stabilizer control, the lever 161 is a lever for operating the boom/bucket, and the lever 162 is a lever for operating the swing.

The lever 162 for operating the swing is connected to the selector valve 152, the selector valve 152 and the selector valve 154 are connected by the coupling member 150*b*, and the selector valve 154 is operated in synchronization with the selector valve 152. In FIG. 11, the selector valve 152 and the selector valve 154 are mounted with rods connected to the respective selector valves and the coupling member 150*b* in an inverted U shape in a front view is connected to tip ends of these rods.

In the control valve section 150, the selector valve 152 for swing control is disposed on the upstream side and the selector valve 153 for arm control is connected on the downstream side in an oil path connected to the discharge port P1. After connecting the selector valve 159 for boom control and the selector valve 158 for bucket control to an oil path connected to the discharge port P2, the oil path is connected to the oil path of the discharge port P1 via the check valve 156 and between the selector valve 152 for swing control and the selector valve 153 for arm control. The selector valve 154 for selecting connection to or disconnection from the oil path on the side of the hydraulic oil tank 90 is provided upstream of the check valve 156.

As a result, by switching the selector valve 154 for selecting connection to or disconnection from the hydraulic oil tank 90 upstream of the check valve 156, the pressure oil of the hydraulic pump (P2) connected to the boom cylinder 108 and the bucket cylinder 110 is supplied to the selector valve 153 for arm control. Therefore, it is possible to actuate the arm cylinder 109 even when the swing is operated at the same time.

Moreover, a bleed throttle 150*c* is provided in an oil path connecting a P port and a T port of the selector valve 152 for the swing. As a result, by allowing a surplus flow rate of the pressure oil supplied to the swing cylinders 107*b* which require relatively small flow rates to flow into the arm cylinder 109, the arm can be actuated in operation in combination with the swing and the boom.

Because the selector valve 154 for selecting connection to or disconnection from the hydraulic oil tank and the selector valve 152 for swing control are actuated in synchronization by the one operating lever 162, it is possible to simultaneously control the selector valve 152 for the swing cylinders 107*b* and the selector valve 154 with only one lever action of operation of the lever 162.

In order to make a resultant force of spool operating forces (spool returning spring forces) of the selector valve 154 and the selector valve 152 substantially equal to spool operating forces of other selector valves, the spool valve returning spring forces of the selector valves 154, 152 are set to be smaller than those of other selector valves. Because the selector valve 154 and the selector valve 152 are operated simultaneously, the spool operating forces of the two selector valves are applied in operation of the lever 162. Therefore, by setting the respective selector valve spool operating forces of the selector valve 154 and the selector valve 152 small, occurrence of an uncomfortable feeling in operation of the lever 162 is suppressed to improve operability of the lever 162.

Moreover, by integrally building the selector valve 154 in the control valve unit 103 and disposing it on the upstream side, it is possible to make an installation space of the selector valve compact. Moreover, by sharing the selector valves used in the valve group, it is possible to reduce the cost of manufacturing. In the operation that requires only one pump, the hydraulic oil from the other pump is unloaded into the tank by a short route and therefore becomes less susceptible to pressure loss of the piping and an engine output can be used effectively.

By building the selector valve 154 for switching between connection and disconnection of the pressure oil from the discharge ports P1, P2 to and from the tank in the most downstream position in the upstream selector valve group, it is possible to supply the pressure oil to the upstream valve section irrespective of the switched state of the selector valve. For example, in the embodiment, it is possible to switch to the back hoe operation state and to actuate the loader work machine. The loader bucket can be brought in contact with the ground to secure stability in the operation or the bucket can be lifted to facilitate movement of the machine.

INDUSTRIAL APPLICABILITY

The present invention can be used for the hydraulic circuit structure of the work vehicle and particularly for the hydraulic circuit structure for effective driving of the hydraulic work machines attached to the work vehicle.

The invention claimed is:

1. A hydraulic circuit structure for a work vehicle equipped with a loader and a back hoe, comprising:

a loader control valve unit including control selector valves for controlling respective actuators for the loader;

a back hoe control valve unit including control selector valves for controlling respective actuators for the back hoe, wherein the control selector valves of the back hoe control valve unit include a first stabilizer control selector valve for controlling one of left and right stabilizer cylinders, a second stabilizer control selector valve for controlling the other of the left and right stabilizer cylinders, a swing control selector valve, an arm control selector valve, a boom control selector valve, and a bucket control selector valve;

a first hydraulic pump having a discharge oil path for supplying pressure oil, wherein the discharge oil path of the first hydraulic pump is connected to the first stabilizer control selector valve, the swing control selector valve, and the arm control selector valve in the back hoe control valve unit, and wherein the swing control selector valve and the arm control selector valve are tandem-connected to the discharge oil path of the first hydraulic pump so that a portion of the discharge oil path of the first hydraulic pump connected to the swing control selector valve is disposed at an upstream side of a portion of the discharge oil path of the first hydraulic pump connected to the arm control selector valve; and a second hydraulic pump having a discharge oil path for supplying pressure oil, wherein the discharge oil path of the second hydraulic pump is connected to the boom control selector valve, the bucket control selector valve, and the second stabilizer control selector valve in the back hoe control valve unit, wherein one of the respective discharge oil paths of the first and second hydraulic pumps is passed through the control selector valves of the loader control valve unit before it is introduced into the back hoe control valve unit, wherein the other of the respective discharge oil paths of the first and second hydraulic pumps is not passed through the control selector valves of the loader control valve unit before it is introduced into the back hoe control valve unit, and wherein the back hoe control valve unit further includes:

a check valve through which a portion of the discharge oil path of the second hydraulic pump after being connected to the boom control selector valve and the bucket control selector valve is connected to a portion of the discharge oil path of the first hydraulic pump between the portions thereof connected to the swing control selector valve and the arm control selector valve; and an additional selector to which the portion of the discharge oil path of the second hydraulic pump after being connected to the boom control selector valve and the bucket control selector valve is connected at an upstream side of the check valve so as to be connected to a tank through the additional selector valve or to be disconnected from the tank by the additional selector valve, selectively.

2. The hydraulic circuit structure of the work vehicle according to claim 1, wherein a bleed throttle is provided in an oil path connecting a pump port and a tank port of the swing control selector valve so as to supply a surplus pressure oil from the swing control selector valve to the arm control selector valve.

3. The hydraulic circuit structure of the work vehicle according to claim 1, further comprising an operation interlock for actuating the additional selector valve and the swing control selector valve in synchronization by operation of one operating lever.

4. The hydraulic circuit structure of the work vehicle according to claim 3, wherein a spool returning spring force of each of the additional selector valve and the swing control selector valve is set smaller than a spool returning spring force of each of the other control selector valves of the back hoe valve unit or of each of control selector valves of the loader control valve unit so that a resultant force of spool operating forces of the additional selector valve and the swing control selector valve becomes substantially equal to a spool operating force of each of the other control selector valves of the back hoe control valve unit or of each of the control selector valves of the loader control valve unit.

5. The hydraulic circuit structure of the work vehicle according to claim 1, wherein the first and second hydraulic pumps are variable displacement piston pumps.

6. The hydraulic circuit structure of the work vehicle according to claim 5, wherein the variable displacement piston pumps serving as the first and second hydraulic pumps are combined into an integral hydraulic pump having a first discharge port, a second discharge port and a common oil introduction port, wherein both the first and second hydraulic pumps are supplied with pressure oil from the oil introduction port, wherein the discharge oil path of the first hydraulic pump is extended from the first discharge port, and wherein the discharge oil path of the second hydraulic pump is extended from the second discharge port.

7. The hydraulic circuit structure of the work vehicle according to claim 6, wherein a third pump for supplying the pressure oil to a steering cylinder for controlling steered wheels of the work vehicle, and to a charge circuit for charging the pressure oil to a hydrostatic transmission of the work vehicle is integrally provided in a pump unit including the integral hydraulic pump, and wherein the pump unit has an oil introduction port through which pressure oil is introduced into the pump unit so as to be shared between the integral hydraulic pump and the third pump.

8. The hydraulic circuit structure of the work vehicle according to claim 5, wherein the variable displacement piston pumps serving as the first and second hydraulic pumps have a P-Q characteristic in which a discharge quantity is substantially constant while a discharge pressure increases up to a first break point, and the discharge quantity is reduced as the discharge pressure increases beyond the first break point, wherein the discharge pressure at the first break point is set equal to or higher than a relief pressure set for a discharge pressure of a single variable displacement piston pump.

9. A hydraulic circuit structure of a work vehicle equipped with a loader and a back hoe, comprising:

a loader control valve unit including control selector valves for controlling directions and flow rates of pressure oil supplied to respective actuators for the loader;

a back hoe control valve unit including control selector valves for controlling directions and flow rates of pressure oil supplied to respective actuators for the back hoe;

a first hydraulic pump having a first discharge port from which a discharge oil path of the first hydraulic pump is extended to supply pressure oil to the back hoe control valve unit after passing through all the control selector valves of the loader control valve unit;

a second hydraulic pump having a second discharge port from which a discharge oil path of the second hydraulic pump is extended to supply pressure oil to the back hoe control valve unit without passing through the control selector valves of the loader control valve unit; and an operation mode selecting selector valve which is switchable between a load position and a back hoe position, wherein the operation mode selecting selector valve is integrated in the loader control valve unit at a downstream of all the control selector valves of the load control valve unit, wherein the discharge oil path of the first hydraulic pump is passed through the operation mode selecting selector valve regardless of whether the operation mode selecting selector valve is set at the load position or the back hoe position, and wherein the discharge oil path of the second hydraulic pump is connected to a tank by the operation mode selecting selector valve set at the load position, or is disconnected from the tank by the operation mode selecting selector valve set at the back hoe position, selectively.

10. The hydraulic circuit structure of the work vehicle according to claim 9, wherein the first and second hydraulic pumps are combined into an integral hydraulic pump having the first discharge port, the second discharge port and a common oil introduction port, wherein both the first and second hydraulic pumps are supplied with pressure oil from the oil introduction port, wherein a third pump for supplying the pressure oil to a steering cylinder for controlling steered wheels of the work vehicle, and to a charge circuit for charging the pressure oil to a hydrostatic transmission of the work vehicle is integrally provided in a pump unit including the integral hydraulic pump, and wherein the pump unit has an oil introduction port through which pressure oil is introduced into the pump unit so as to be shared between the integral hydraulic pump and the third pump.

11. The hydraulic circuit structure of the work vehicle according to claim 9, wherein the operation mode selecting selector valve is provided with a detent or is a solenoid valve so that a state to which the operation mode selecting selector valve is switched can be maintained.

12. The hydraulic circuit structure of the work vehicle according to claim 9, wherein first and second relief valves are provided in the loader control valve unit, wherein the first relief valve is provided between the discharge oil path of the first hydraulic pump and a tank port of the loader control valve unit, and the second relief valve is provided between the discharge oil path of the second hydraulic pump and the tank port of the loader control valve unit at an upstream side of the operation mode selecting selector valve when being set at the load position, so as to define maximum operating pressures for operating the actuators for the loader and the back hoe to be driven by the pressure oil from the first and second hydraulic pumps.

* * * * *